Feb. 14, 1961 J. MARTIN 2,971,728
FIRING MECHANISM FOR AIRCRAFT SEAT EJECTION DEVICES
Filed June 24, 1958 5 Sheets-Sheet 4
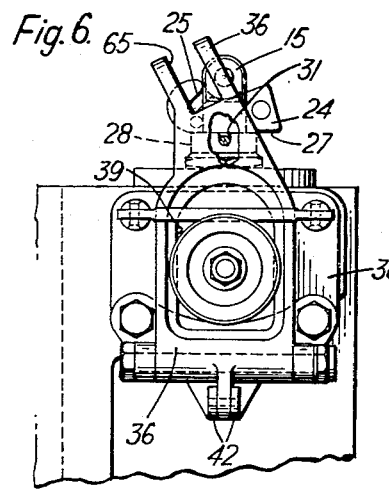
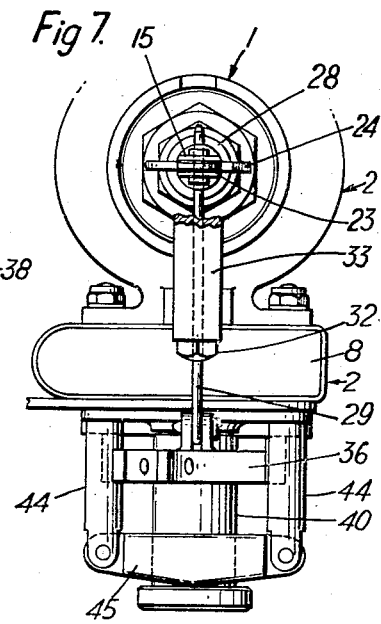
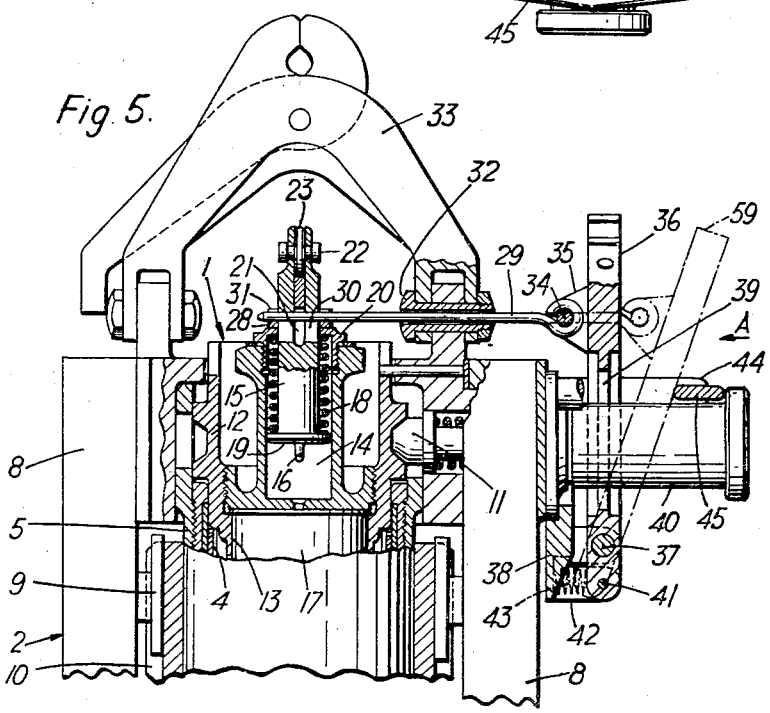

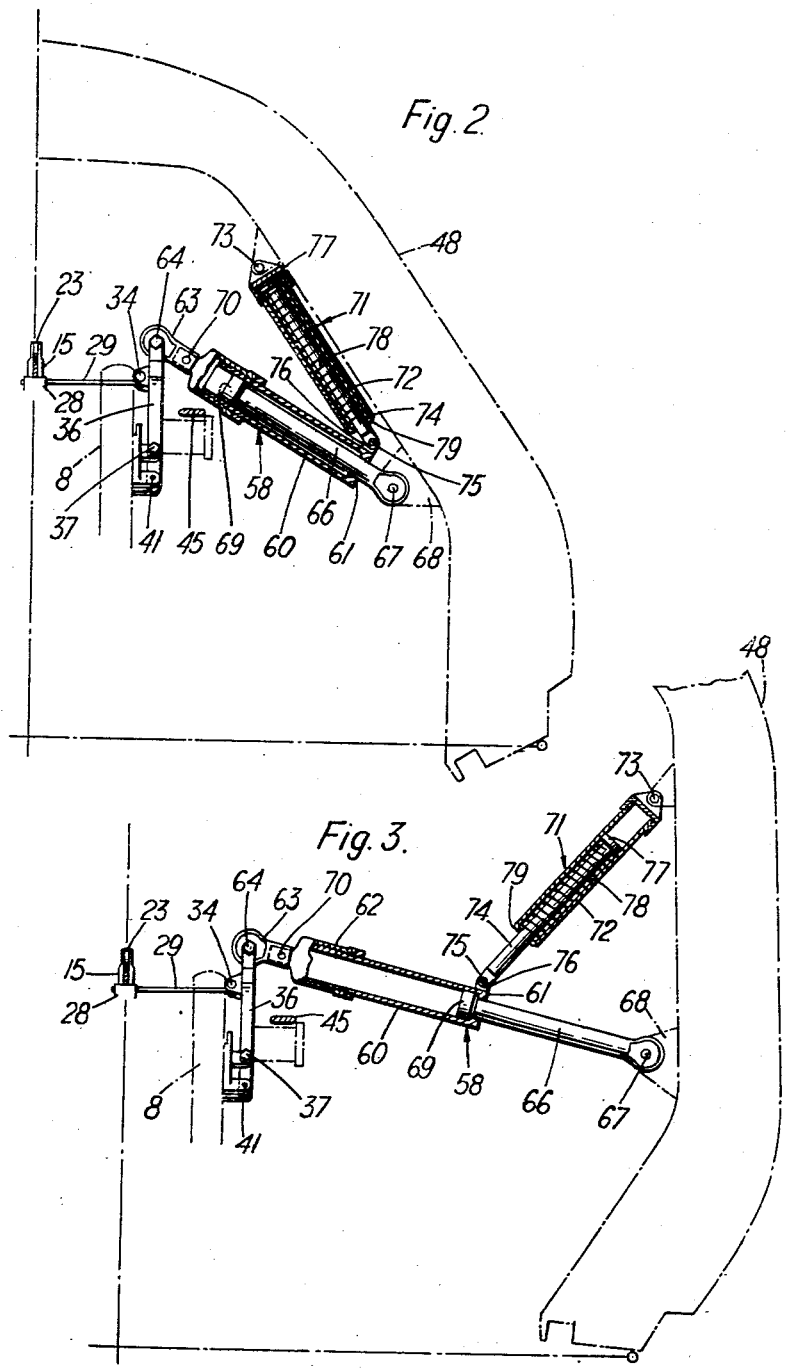

Feb. 14, 1961  J. MARTIN  2,971,728
FIRING MECHANISM FOR AIRCRAFT SEAT EJECTION DEVICES
Filed June 24, 1958
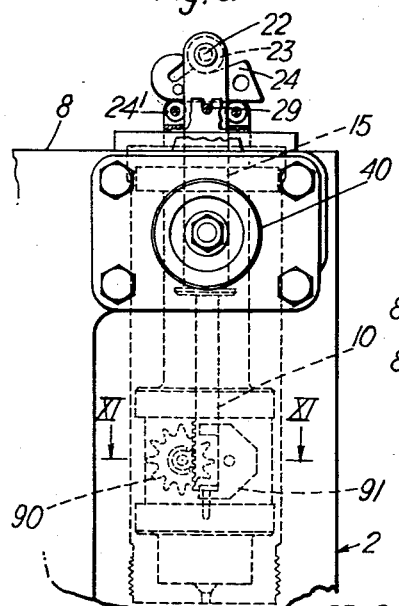
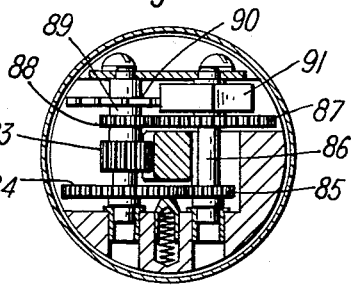
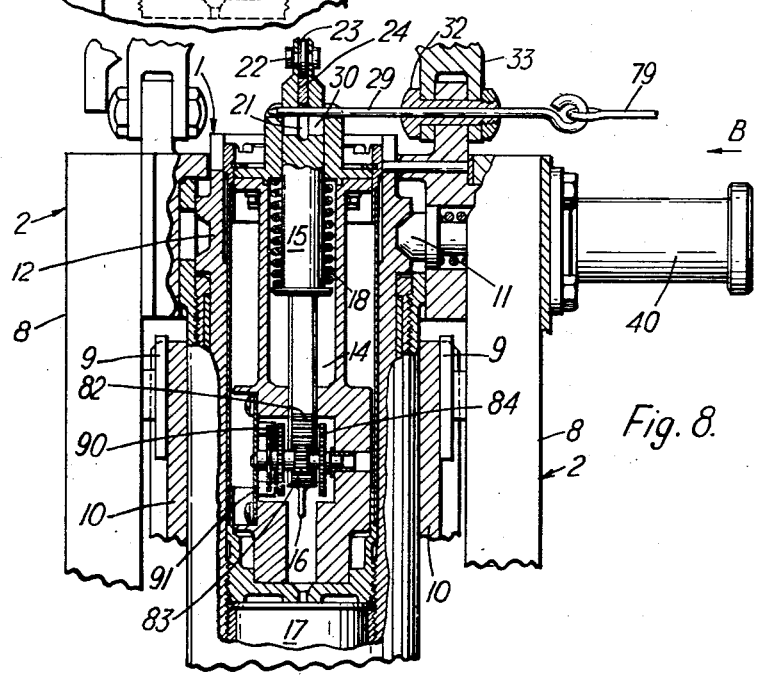

United States Patent Office 2,971,728
Patented Feb. 14, 1961

2,971,728
FIRING MECHANISM FOR AIRCRAFT SEAT EJECTION DEVICES

James Martin, Southlands Manor, Southlands Road, Denham, near Uxbridge, Middlesex, England Filed June 24, 1958, Ser. No. 744,250

Claims priority, application Great Britain June 26, 1957

4 Claims. (Cl. 244—121)

This invention relates to firing mechanism suitable for aircraft seat ejection devices of the kind comprising an ejection gun adapted for launching a seat from an aircraft upon the uncovering of an ejection opening in the aircraft.

Before an airman can safely be ejected from an aircraft it is first necessary to form an ejection opening in the fuselage of the aircraft sufficiently large to permit the passage therethrough of the ejection seat and its occupant. For this purpose, in some instances, it is necessary to effect the opening of a hinged cockpit canopy from a normal open position in which the occupant is afforded normal access to or from the aircraft, to an emergency open position in which the opening provided is large enough for the passage therethrough of the ejection seat and its occupant. In other instances it is desirable to jettison the cockpit canopy entirely prior to ejection of the seat and its occupant.

Whilst it is important that in the process of seat ejection the occupant of the seat should be relieved of as many mechanical acts as is possible, it is sometimes necessary to effect, as the case may be, canopy opening to the emergency position thereof or canopy jettisoning without subsequent launching of the ejection seat. Thus, one object of the present invention is to provide for the formation of an ejection opening in the aircraft without necessarily firing the ejection gun. Another object is to prevent the firing of the ejection gun prior to the forming of the said ejection opening.

According to this invention there is provided a firing mechanism suitable for an ejection gun of the kind employed for launching an ejection seat from an aircraft cockpit normally covered in flight by a canopy, such gun comprising relatively slidable co-linear parts, one part adapted to be anchored to the aircraft and a further part for carrying the ejection seat from the aircraft, a breech chamber for receiving an explosive cartridge for generating gas pressure to cause relative seat ejecting movement between the said relatively slidable gun parts, and a spring loaded firing plunger for detonating said cartridge, such firing mechanism being provided with two separate means for normally independently restraining the said firing plunger from operation, each such restraining means comprising a restraining element engaging in said firing plunger and against an abutment on or associated with said breech chamber, said restraining elements being totally independent of one another and adapted for separate withdrawal from said plunger in any order to remove their restraints therefrom, one such restraining element being connected or adapted for connection to a member operable by the airman using the ejection seat and entirely under his control, and the other such restraining element having connected thereto rigid link means for linking it to the canopy of the aircraft or to a part thereof so that the restraining element will automatically be withdrawn from the said firing plunger when the said canopy or canopy part has moved relatively to the cockpit sufficiently far to afford the airman and his ejection seat full freedom for ejection from the cockpit.

The invention may readily be applied, as hereinafter described, to aircraft having hinged cockpit canopies which are not jettisoned as well as to aircraft having totally detachable and jettisonable canopies.

Further features of the invention will become apparent from the following description of certain embodiments of the invention, this description being given by way of example in order that the invention may be more readily understood and carried into practice and with reference to the accompanying drawings, in which:

Figure 1 is a perspective view showing the application of the invention to an aircraft having a dual cockpit having a longitudinally split or two-part hinged canopy, the drawing illustrating the position of the front ejection seat only of the cockpit, the dual firing plunger-restraining means for this seat, the mechanism for opening the canopy, and the means for operating one of the dual restraining means for the rear ejection seat, the mechanism being shown in this way for the sake of clarity;

Figure 2 shows the canopy-operated firing plunger-restraining means with one half of the hinged canopy in its closed position and the mechanism connecting such canopy half to the said restraining means;

Figure 3 is a view similar to Figure 2 but shows the canopy half in its normal open position permitting normal entry and exit of an airman to and from the cockpit;

Figure 5 is a part front elevation and part vertical sectional view illustrating the upper end portion of an aircraft ejection seat of the Martin-Baker type having this invention applied thereto, the connections to the canopy being omitted;

Figure 6 is a side elevation of the mechanism illustrated in Figure 5, viewed in the direction of arrow A;

Figure 7 is a half plan of the top of the ejection seat shown in Figure 5;

Figure 8 is a part front elevation and part vertical sectional view similar to Figure 5 but illustrating the canopy operated dual firing plunger-restraining means connected by a cable to the canopy and also illustrating the inclusion of a time delay mechanism in the ejection gun firing pin assembly;

Figure 9 is a side elevation taken in the direction of arrow B (Figure 8) of the mechanism shown in the latter figure; and Figure 10 is a section on line XI—XI, Figure 9.

Figure 1:
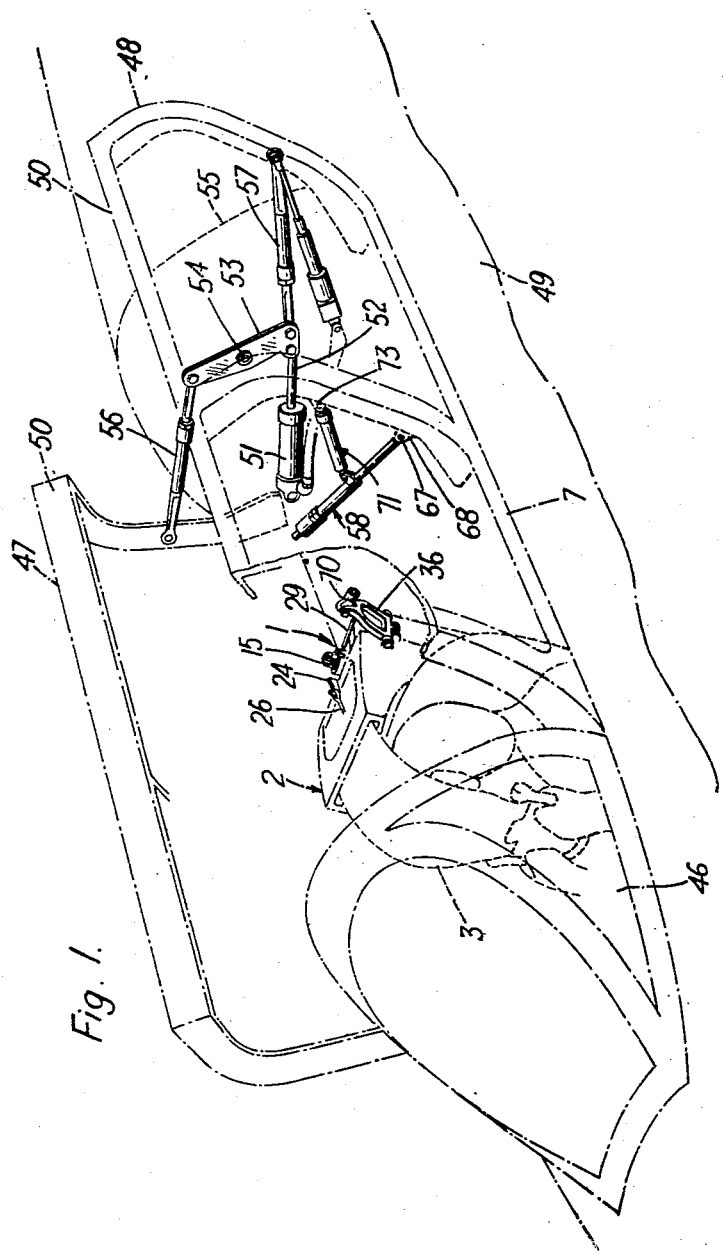

Figures 1 to 7 of the drawings illustrate the present invention applied to an ejection gun 1 of an aircraft ejection seat 2 of the Martin-Baker type in which the firing of the ejection gun to eject the seat from the aircraft is achieved by the pilot pulling down over his head a face screen or blind 3 carried by the upper part of the ejection seat, the seat operating along the general lines described in Patent No. 2,467,763 but as modified from time to time during subsequent development.

The ejection gun 1 is preferably of the telescopic type comprising an inner piston 4 and one or more outer cylinders or barrels 5 (see Figure 5) such as described in Patent No. 2,736,236, for example, the outer cylinder or barrel being secured at its lower end to the aircraft 7 whilst the inner piston 4 is connected at its upper end to the tops of the side beams 8 of the frame of the ejection seat 2, the ejection gun 1 being located centrally between, and parallel to, the said side beams 8 of the seat frame. The seat frame is preferably furnished internally with slippers 9 which slide in guide channels 10 provided on the outer cylinder or barrel 5 of the ejection gun 1 as described in Patent 2,808,217 and the seat frame is normally locked to the barrel as by plunger means 11 such as described in Patent No. 2,806,664.

The ejection gun firing mechanism comprises an assembly or unit including a generally cylindrical hollow body 12 coaxially screwed into the upper end of the tubular piston 4 and containing in its lower part a cartridge receiving chamber 13 and in its upper part a breech chamber 14 in which is slidably coaxially mounted a firing plunger 15 having at its lower end a firing pin 16 adapted to pass through a hole in the bottom of the breech chamber and to detonate a cartridge 17 located in the chamber 13. The firing pin 16 is strongly urged towards its firing position by a compression spring 18 arranged around the firing plunger 15 and between a shoulder 19 at the lower end of the latter and a closure cap 20 screwed into the upper end of the breech chamber. The firing plunger projects upwardly through the said cap 20 and is longitudinally slotted or bifurcated at 21, a short spindle 22 being secured transversely in the upper end of the firing plunger and carrying a roller 23 located in the slot 21.

Also mounted in the slot 21 of the plunger 15 is a withdrawable sear 24 (see Figures 5, 6 and 7) of wedge-shape in side elevation and having a hook like formation 25 at one end for connection to a cable 26 (see Figure 1) attached to the face screen or blind 3, the sear 24 thus being withdrawable from the firing pin plunger 15 on the blind 3 being pulled fully down by the airman. In its normal position the lower horizontal edge 27 of the sear 24 rests upon the upper edge of a cylindrical collar 28 (or on guide rollers 24' on said collar as shown in Figure 10) on the upper end of the breech chamber cap 20 so as to hold the firing plunger 15 in its cocked position and only when the sear 24 is withdrawn is the restraint of the sear on the firing plunger removed from the latter. The upper edge of the said collar (or said rollers 24') steady and guide the sear during its withdrawal from the plunger 15.

To prevent the firing plunger 15 operating to cause the firing pin 16 to detonate the cartridge 17 before the aircraft canopy has been opened and even if the sear 24 has been withdrawn from the plunger 15, a second firing pin restraining element is provided, this being in the form of a rectilinear pin 29 which normally passes diametrically through a longitudinal slot 30 provided in the firing plunger 12 and perpendicular to the slot 21, the pin 29 being located in a pair of diametrically opposite notches 31 in the upper end of the collar 28 of the breech chamber cap 20 and being axially withdrawable from the plunger 15.

The pin 29 is mounted for free guided sliding movement in a tubular bolt 32 forming one of a pair of bolts hingedly connecting a scissor shackle 33 to the top of the frame of the ejection seat 2, this shackle being for releasable connection to the cable of a drogue parachute and forming no part of this invention. The tubular bolt 32 is spaced laterally from the plunger 15 and provides an adequate guide for the pin 29 to prevent its being bent or broken in use.

The outer end of the pin 29 is pivotally connected by a pin 34 to a pair of lugs 35 on a lever 36 pivoted, near to but spaced from its lower end, on a pivot pin 37 carried by a bracket 38 fixed to one of the side beams of the ejection seat 2, the lever 36 having a central opening 39 to accommodate a cylindrical housing 40 associated with the locking plunger 11 which forms no part of this invention.

The lever 36 is normally maintained in the position shown in full lines in Figure 5 by means of a shear pin 41 passing through the lower end of the lever and into a pair of lugs 42 forming part of the bracket 38, the said pin being readily sheared when any withdrawal force exceeding a predetermined value is applied to the upper end of the lever 36. Instead of the shear pin 41, a compression spring 43, indicated in dotted lines in Figure 5, may be provided between the bracket 38 and the lower end of the lever 36.

To limit the withdrawal movement of the lever 36 the bracket 38 is furnished with a pair of outwardly projecting side arms 44 bridged by a stop bar 45 with which the lever 36 engages when fully withdrawn, i.e. when the tip of the pin 29 has completely left the slot 30 in the firing plunger 15.

Figures 1 to 4 illustrate how the lever 36 is operated when an ejection seat having dual firing pin-restraining means as above described is applied to an aircraft having a clam or longitudinally split hinged type of canopy. Referring to the said figures it will be seen that the cockpit of the aircraft has a front windscreen behind which is a canopy comprising a longitudinally symmetrically split canopy comprising two halves 47 and 48, each half of the canopy being hinged along its lower edge to the sides of the fuselage 49 of the aircraft and having their upper edges 50 adapted to meet in the longitudinal medial plane of the aircraft when the canopy is closed. The two halves of the canopy are adapted to be opened by a pneumatic or hydraulic cylinder and piston assembly 51 of which the piston 52 is connected to one end of a double ended lever 53 pivoted at 54 to a bulk-head 55 of the aircraft, said lever being pivotally connected at its opposite ends respectively to the inner ends of adjustable links 56 and 57 one of which is pivotally connected at its outer end to the half 47 of the canopy and the other of which is pivotally connected at its outer end to the half 48 of the canopy. This canopy opening mechanism is of known form and is so constructed that the canopy can be opened to two alternative positions namely, that shown in Figure 3 which is the "normal" open position permitting the airman to enter and leave the aircraft as and when he so desires in normal circumstances, and the position shown in Figure 4 which is an emergency position wherein the two halves of the canopy are opened far enough to avoid any danger of the ejection seat 2 contacting the canopy when it is ejected from the aircraft.

Figure 4:
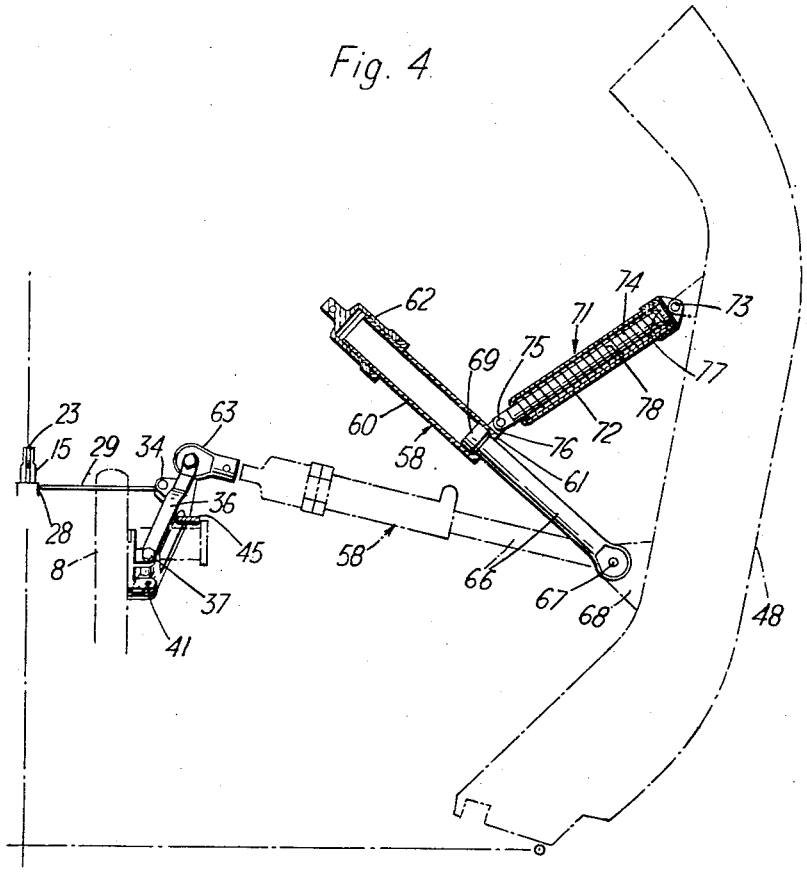
Figure 4 is a view similar to Figures 2 and 3 but showing the canopy half illustrated in these figures fully opened to its emergency position with the canopy-operated firing plunger-restraining means fully operated to release the firing pin of the ejection gun of the ejection seat.

According to the invention use is made of the movement of the canopy halves from the position shown in Figure 3 to that shown in Figure 4 for the purpose of withdrawing the firing pin restraining pin 29 from its operative position, this being achieved by connecting the upper end of the lever 36 to the canopy half 48 by a rigid link means generally indicated by the reference 58 and which is freely extensible or telescopable to a limited extent. This link provides for a certain amount of lost motion so that the lever 36 is not actuated by the canopy half 48 as it moves from its fully closed to its "normal" open position, the link nevertheless being designed to ensure that as the canopy half 48 moves from the said "normal" position towards its "emergency" position, the link operates the lever 36 and moves it into the position shown at 59 in dot and dash lines in Figure 5, the lever 36 fully withdrawing the restraining pin 29 from the firing plunger 15 during this movement.

In the example shown the link means 58 comprises a cylinder 60 having an inwardly directed stop shoulder or flange 61 at its outer end and furnished at its other end with an adjustable cap 62 by which the effective extended length of the link can be adjusted, this cap being provided with a lug 63 through which passes a pivot pin 64 also passing through the bifurcated upper end 65 of the lever 36, the lug 63 being located in the said bifurcation.

The second part of the link 58 comprises a rod 66 pivoted at 67 between a pair of lugs 68 carried by the canopy half 48, whilst the other end of the rod 66 has a stop flange or head 69 slidable within the cylinder 60 but not withdrawable from the latter beyond the inwardly directed stop flange 61 thereof.

The extended length of the link 58 is so adjusted, by means of the cap 62, that until the canopy half 48 has reached its normal open position the rod 66 does not affect the cylinder 60 but so that, as the canopy half moves outwardly beyond its normal position, the head of the rod 66 engages the flange 61 of the cylinder 60 and causes the cylinder to move linearly with the rod 66 thus causing the shear pin 41 to be fractured and the lever 36 to be swung outwardly and the restraining pin 29 to be withdrawn from the firing plunger 15.

In order that the link means 58 should not be an obstacle to the discharge of the ejection seat from the aircraft after the canopy halves have moved to their emergency position, means are provided for freeing the link 58 from the lever 36 and for withdrawing the link into an out-of-the-way position. Thus the cap 62 is connected to the lug 63 by a shear pin 70 of sufficient robustness as to transmit the necessary withdrawal movement from the canopy through the link 58 to the lever 36 but which pin will fracture readily when the lever 36 engages the cross stop bar 45 so that its outward movement is arrested whilst the canopy half 48 continues to move outwardly, the bar 45 being so positioned that the lever 36 engages the same just prior to the canopy 48 moving to its extreme emergency position.

For lifting the link means 58 out of the way when the cap 62 has been disconnected from the link 63, a second lost motion-providing link 71 is furnished, this link being of an extensible or telescopic type similar to the link 58 and comprising a cylinder 72 pivoted at its upper end at 73 to the canopy half 48 at a distance above the pivot 67, and having slidably mounted therein a rod 74 pivoted at its lower end 75 to a lug 76 on the inwardly flanged end of the cylinder 60 of the link 58, the rod 74 having a head 77 and being surrounded by a compression spring 78 located between the head 77 and an inwardly turned stop flange 79 at the lower end of the link cylinder 72. Thus the arrangement is such that during the early part of the opening of the canopy half 48, the link 71 is extended and the spring 78 is placed under compression, whilst as soon as the pin 70 is sheared, the spring 78 contracts the link 71 so raising the link 58 into the out-of-the-way position shown in Figure 4.

It will, of course, be appreciated that one of the link assemblies 58, 71 is provided for the firing pin plunger restraining pin 29 of each ejection seat in the aircraft and that although the link assemblies 58, 71 for the rear seat only has been shown in Figure 1, such an assembly would be provided for the front seat 2 of the aircraft, this being the only seat illustrated in Figure 1 and the rear seat being omitted, again for the sake of clarity in the drawings.

Appropriate means (forming no part of this invention) will, of course, be provided for opening the canopy.

In the operation of the arrangement, the movement of the cockpit canopy halves to their full emergency opening effects the removal of the restraining pin 29 from the plunger 15 but has no effect whatsoever on the sear 24 which is wholly and independently controlled by the actuation by the airman of the face screen or blind 3. Thus when the canopy is opened to its emergency position it does not necessarily follow that the ejection gun 1 will be operated. This can only happen when the sear 24 has been or is withdrawn and this withdrawal is entirely at the discretion of the airman. On the other hand if the airman should pull down the screen or blind 3 before the cockpit canopy has been opened beyond its normal position, the ejection gun will not be fired and the seat ejected until such time as the canopy has opened almost to its full emergency position and the pin 29 has been completely withdrawn from the plunger 15.

A time delay mechanism may be provided in the ejection gun firing mechanism and such a time delay mechanism may be used in the hinged clam type canopy system previously described herein, if desired. Such a time delay mechanism is shown in the modification illustrated in Figures 9 to 10 and, as will be seen, the firing unit or assembly inserted into the top of the seat ejection gun includes a toothed rack 82 on the firing pin plunger 15 and which is, when the plunger 15 is in its cocked or withdrawn position, in mesh with a spur pinion 83 rigidly and coaxially fixed to a spur pinion wheel 84 meshing with a further spur pinion 85 fixed on a shaft 86 also having fixed therein a spur wheel 87 engaging with a further spur pinion 88 fixed upon a sleeve 89 freely rotatable independently of the pinion 83 and coaxially fixed to a star wheel 90 co-operating with a rockable U-shaped escapement element 91: such a time delay mechanism is described in co-pending patent application Serial No. 662,883. It will be seen that where such a time delay mechanism is employed, then even when both the restraining pin 29 and the sear 24 have both been withdrawn from the plunger 15, the time delay mechanism provides a still further delay in the release of the firing pin and the operation of the latter. It will be appreciated that the firing pin plunger 15, the rack 82 and the time delay mechanism are all included in a single unit inserted into and fixed in the top of the piston of the ejection gun.

I claim:

1. A firing mechanism for an ejection gun employed for ejecting a seat from an aircraft cockpit normally covered by a canopy, said gun having a firing pin, a spring-loaded plunger for actuating said firing pin, said plunger having therein a transverse hole and a transverse slot spaced at right angles to each other, first and second means, independently operable in any order, for restraining said plunger, said first means comprising a restraining pin slidably positioned in said hole, rigid link means having one end connected to one end of said restraining pin and the other end connected to said canopy so that displacement of said canopy causes said link means to withdraw said pin from said hole, said second restraining means comprising a sear positioned in said transverse slot of said plunger and releasable manually.

2. A firing mechanism as recited in claim 1, in which said link means comprises telescoping members, a stop on one of said members for limiting its extension, one end of said link means being pivoted to a portion of said canopy and the other end of said link means being connected to said restraining pin, whereby movement of said canopy does not cause removal of said pin until said telescoping members are extended to said stop.

3. A firing mechanism as recited in claim 1, in which said link means includes shear means for automatically releasing said link means from said restraining pin after displacement of said pin.

4. A firing mechanism as recited in claim 3, in which said link means is provided with spring-loaded means for withdrawing said link means when it has been disconnected from said restraining pin.

References Cited in the file of this patent

UNITED STATES PATENTS

| 2,709,556 | Jandris | May 31, 1955 |
| 2,726,055 | Musser | Dec. 6, 1955 |
| 2,820,602 | Foster | Jan. 21, 1958 |

FOREIGN PATENTS

| 748,956 | Great Britain | May 16, 1956 |
| 763,581 | Great Britain | Dec. 12, 1956 |